(12) United States Patent  
Lee

(10) Patent No.: US 9,025,427 B2  
(45) Date of Patent: May 5, 2015

(54) DATA TRANSMISSION CIRCUIT AND DATA TRANSMISSION / RECEPTION SYSTEM

(71) Applicant: SK hynix Inc., Gyeonggi-do (KR)

(72) Inventor: Geun-Il Lee, Gyeonggi-do (KR)

(73) Assignee: SK Hynix Inc., Gyeonggi-do (KR)

( * ) Notice: Subject to any disclaimer, the term of this patent is extended or adjusted under 35 U.S.C. 154(b) by 0 days.

(21) Appl. No.: 14/543,302

(22) Filed: Nov. 17, 2014

(65) Prior Publication Data

US 2015/0071047 A1    Mar. 12, 2015

Related U.S. Application Data

(62) Division of application No. 12/833,320, filed on Jul. 9, 2010, now Pat. No. 8,891,346.

(30) Foreign Application Priority Data

Apr. 29, 2010   (KR) .................. 10-2010-0039982

(51) Int. Cl.
| | |
|---|---|
| *H04J 1/12* | (2006.01) |
| *H04J 3/10* | (2006.01) |
| *H04B 1/10* | (2006.01) |
| *H03M 5/00* | (2006.01) |
| *H04B 3/32* | (2006.01) |

(52) U.S. Cl.  
CPC ....................................... *H04B 3/32* (2013.01)

(58) Field of Classification Search  
CPC ..... H04L 25/028; H04L 25/4915; H04B 3/32; G11C 7/1006; G11C 7/1051; H03M 5/145; H03M 7/14; H03M 5/06  
USPC ................... 370/201; 327/85; 341/50, 55, 58; 455/295  
See application file for complete search history.

(56) References Cited

U.S. PATENT DOCUMENTS

| | | | |
|---|---|---|---|
| 2005/0182894 A1* | 8/2005 | LaBerge ...................... 711/105 |
| 2005/0188282 A1* | 8/2005 | Joshi ............................. 714/43 |
| 2008/0069145 A1* | 3/2008 | Chung et al. ................. 370/476 |
| 2009/0179782 A1* | 7/2009 | Hollis ............................ 341/55 |
| 2013/0094302 A1* | 4/2013 | Do ........................... 365/189.05 |

* cited by examiner

*Primary Examiner* — Hoang-Chuong Vu  
(74) *Attorney, Agent, or Firm* — IP&T Group LLP

(57) ABSTRACT

A data transmission/reception system includes a data transmission circuit and a data reception circuit. The data transmission circuit includes a pattern detection unit configured to detect a pattern of data to be loaded on inner lines among a plurality of transmission lines and generate an inversion signal, and a transmission unit configured to transmit data to the plurality of transmission lines and the inversion signal to an inversion line, and invert some of the data to be loaded on the inner lines in response to the inversion signal. The data reception circuit is configured to invert the data inverted by the transmission unit among the data transferred to the plurality of transmission lines, in response to the inversion signal.

6 Claims, 8 Drawing Sheets

DATA TRANSMISSION CIRCUIT AND DATA TRANSMISSION / RECEPTION SYSTEM

CROSS-REFERENCE TO RELATED APPLICATIONS

This application is a division of U.S. patent application Ser. No. 12/833,320 filed on Jul. 9, 2010, which claims priority of Korean Patent Application No. 10-2010-0039982, filed on Apr. 29, 2010. The disclosure of each of the foregoing application is incorporated herein by reference in its entirety.

BACKGROUND OF THE INVENTION

Exemplary embodiments of the present invention relate to technology for transmitting and receiving data.

In general, jitter effects in high-speed data transmission include random jitter effects with inter symbol interference (ISI). Among them, cross talk has the greatest effect upon the data transmission.

FIG. 1 is a diagram illustrating a case in which cross talk occurs on a plurality of parallel lines LINE0 to LINE3 through which data are transmitted. The left-side data are first loaded on the lines LINE0 to LINE3, and the right-side data are later loaded on the lines LINE0 to LINE3.

The cross talk occurs due to a capacitance generated between adjacent lines. The effects caused by the cross talk become severe when the change in value of the data of adjacent lines is opposite to the change in value of the data of a center line therebetween. In other words, cross talk is severe where the voltage levels of two outside lines increases or decreases, while the voltage level of a center line between the two outside lines decreases or increases, respectively. In such a case, the data pattern is referred to as a two-aggressors and one-victim pattern.

In FIG. 1, reference numerals 101, 102, 103, 104, and 105 each indicate a case in which a two-aggressors and one-victim pattern occurs. Referring to reference numeral 101, the data of the line LINE1 changes from low to high (L-H), but the data of the lines LINE0 and LINE2 change from high to low (H-L). In this case, the data of the line LINE1 may have difficulty changing due to the occurrence of cross talk. Similarly, referring to reference numerals 102, 103, and 105, the change in value of the data of the center line is opposite to the change in value of the data of adjacent lines on both sides of the center line. Therefore, in each of the scenarios designated by reference numerals 102, 103, and 105, the data of the center line may have difficulty changing.

Referring to reference numeral 104, the adjacent lines of both lines LINE1 and LINE2 have data that change in an opposite direction. Therefore, in the scenario designated by reference numeral 104, the data of both lines LINE1 and LINE2 may have difficulty changing.

FIG. 2 is a diagram showing a difference in jitter between data of a two-aggressors and one-victim pattern and data of a one-aggressor pattern. In the one-aggressor pattern, a line has only one adjacent line that undergoes a change in data that is opposite its change in data.

As shown in FIG. 2, the one-aggressor pattern data has a jitter of 29.6 ps, but the two-aggressors and one-victim pattern data has a jitter of 56.9 ps.

When such a jitter caused by the cross talk is not removed, it is difficult to transmit data at a high speed without an error.

SUMMARY OF THE INVENTION

Exemplary embodiments of the present invention are directed to a data transmission circuit and a data transmission/reception system, which are capable of reducing errors caused by cross talk occurring during data transmission.

In accordance with an exemplary embodiment of the present invention, a data transmission circuit includes a pattern detection unit configured to detect a pattern of data to be loaded on inner lines among a plurality of transmission lines and generate an inversion signal, and a transmission unit configured to transmit data to the plurality of transmission lines and the inversion signal to an inversion line, and invert some of the data to be loaded on the inner lines in response to the inversion signal.

The inversion signal may be in an inactive state when the data to be loaded on the inner lines have the same logic value, and may be in an active state when the data to be loaded on the inner lines have different logic values.

The plurality of transmission lines may include four lines, and the inner lines may include two lines from among the plurality of transmission lines.

In accordance with another exemplary embodiment of the present invention, a data transmission/reception system includes a data transmission circuit and a data reception circuit. The data transmission circuit includes a pattern detection unit configured to detect a pattern of data to be loaded on inner lines among a plurality of transmission lines and generate an inversion signal, and a transmission unit configured to transmit data to the plurality of transmission lines and the inversion signal to an inversion line, and invert some of the data to be loaded on the inner lines in response to the inversion signal. The data reception circuit is configured to invert the data inverted by the transmission unit among the data transferred to the plurality of transmission lines, in response to the inversion signal.

The data transmission circuit and the data reception circuit may be provided in the same semiconductor device. In this case, it is possible to reduce jitters caused by cross talk which occurs in a chip while data is transmitted.

The data transmission circuit and the data reception circuit may be provided in different semiconductor devices. In this case, it is possible to reduce jitters caused by cross talk which occurs between chips while data is transmitted.

In accordance with yet another exemplary embodiment of the present invention, a data transmission circuit includes a first pattern detection unit configured to detect a pattern of even data to be loaded on first inner lines among a plurality of first transmission lines and generate an even inversion signal, a second pattern detection unit configured to detect a pattern of odd data to be loaded on second inner lines among a plurality of second transmission lines and generate an odd inversion signal, a first transmission unit configured to transmit data to the plurality of first transmission lines and invert some of the even data to be loaded on the first inner lines in response to the even inversion signal, a second transmission unit configured to transmit data to the plurality of second transmission lines and invert some of the odd data to be loaded on the second inner lines in response to the odd inversion signal, and an inversion transmission unit configured to alternately transmit the even inversion signal and the odd inversion signal to an inversion line.

The even inversion signal and the odd inversion signal may be in an inactive state when the data to be loaded on the first and second inner lines, respectively, have the same logic value, and may be in an inactive state when the data to be loaded on the first and second inner lines, respectively, have different logic values.

The plurality of first transmission lines may include four lines, the plurality of second transmission lines may include four lines, the first inner lines may include two lines from among the plurality of first transmission lines, and the second inner lines may include two lines from among the plurality of second transmission lines. The first transmission unit may invert even data to be loaded on one line of the first inner lines when the even inversion signal is in an active state, and the second transmission unit may invert odd data to be loaded on one line of the second inner lines when the odd inversion signal is in an active state.

In accordance with still another exemplary embodiment of the present invention, a data transmission/reception system includes a data transmission circuit and a data reception circuit. The data transmission circuit includes a first pattern detection unit configured to detect a pattern of even data to be loaded on first inner lines among a plurality of first transmission lines and generate an even inversion signal, a second pattern detection unit configured to detect a pattern of odd data to be loaded on second inner lines among a plurality of second transmission lines and generate an odd inversion signal, a first transmission unit configured to transmit data to the plurality of first transmission lines and invert some of the even data to be loaded on the first inner lines in response to the even inversion signal, a second transmission unit configured to transmit data to the plurality of second transmission lines and invert some of the odd data to be loaded on the second inner lines in response to the odd inversion signal, and an inversion transmission unit configured to alternately transmit the even inversion signal and the odd inversion signal to an inversion line. The data reception circuit includes a first reception unit configured to invert the even data inverted by the first transmission unit among the data transferred to the plurality of first transmission lines, in response to the even inversion signal, and a second reception unit configured to invert the odd data inverted by the second transmission unit among the data transferred to the plurality of second transmission lines, in response to the odd inversion signal.

In accordance with still another exemplary embodiment of the present invention, a data transmission/reception system includes a data transmission circuit configured to transmit data through a plurality of transmission lines, and a data reception circuit configured to receive the data through the plurality of transmission lines. The data transmission circuit inverts some data when the data exhibit a pattern, transmits the data to the plurality of transmission lines, and transmits an inversion signal to an inversion line, the inversion signal indicating whether some of the data are inverted or not, and the data reception circuit receives the data through the plurality of transmission lines, receives the inversion signal through the inversion line, and inverts the data inverted by the data transmission circuit in response to the inversion signal.

In accordance with yet another exemplary embodiment of the present invention, a data transmission/reception system includes a data transmission circuit configured to compare a first data and a second data, generate an inversion signal based on the comparison, invert or buffer the first data according to the inversion signal, and transmit the inverted or buffered first data and second data through first and second transmission lines, respectively, and a data reception circuit configured to receive the inverted or buffered first data and second data through the first and second transmission lines, respectively, and to receive the inversion signal.

Here, the comparison may be the result of performing an XOR operation on the first and second data.

Also, the data reception circuit may be further configured to invert or buffer the received inverted or buffered first data according to the inversion signal.

DESCRIPTION OF SPECIFIC EMBODIMENTS

Figure 1:
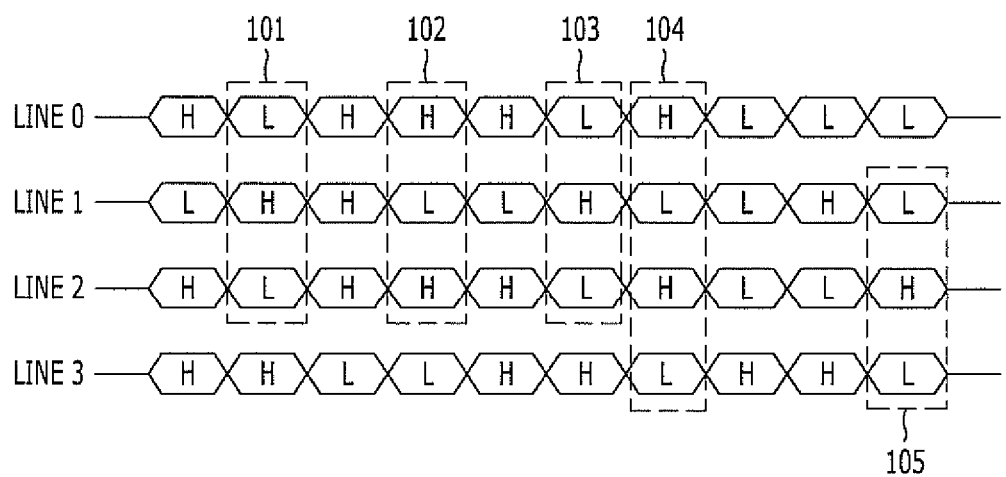
FIG. 1 is a diagram illustrating a case in which cross talk occurs on a plurality of parallel lines through which data are transmitted.
Figure 2:
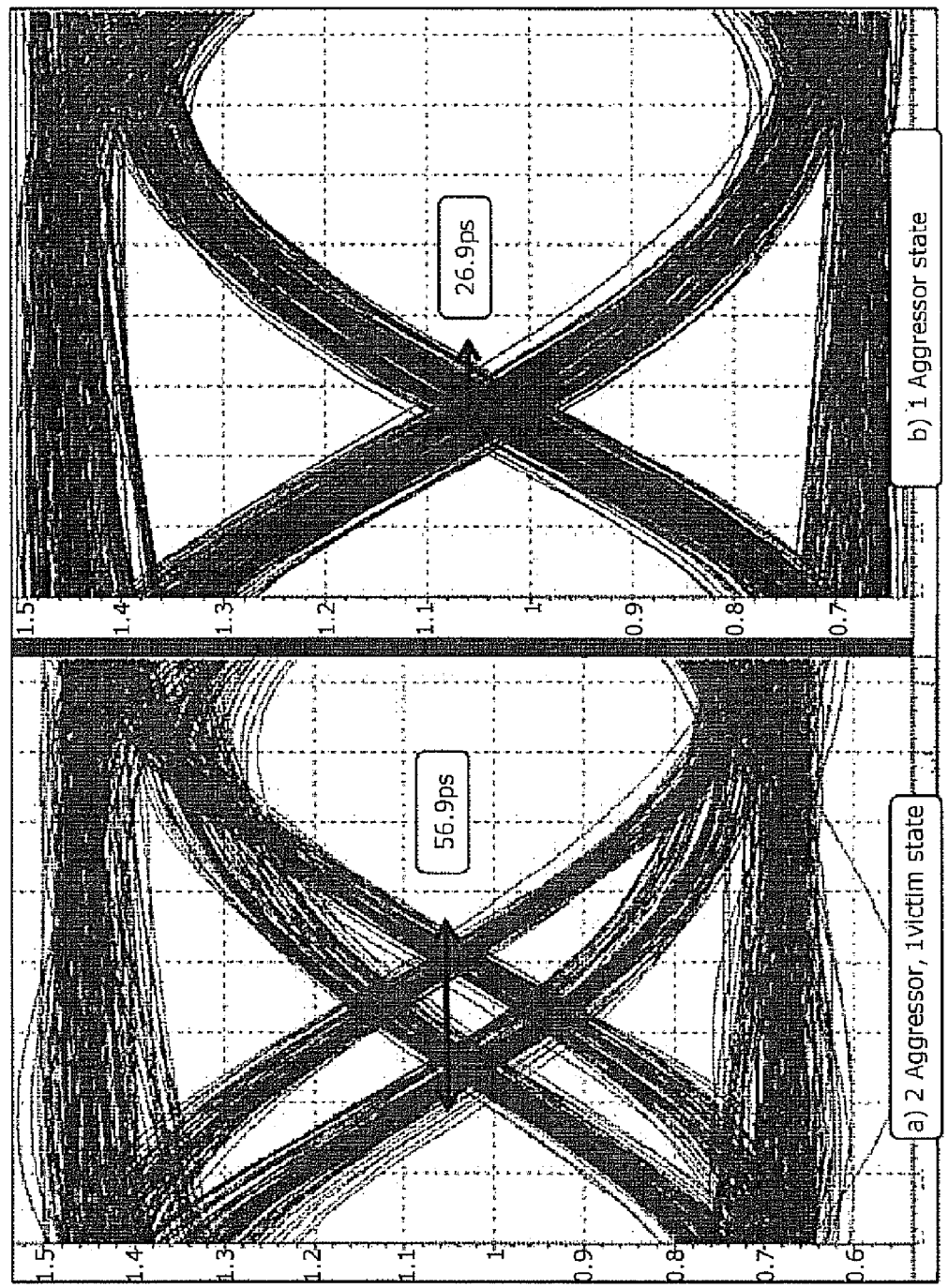
FIG. 2 is a diagram showing a difference in jitter between data of a two-aggressors and one-victim pattern and data of a one-aggressor pattern.

Exemplary embodiments of the present invention will be described below in more detail with reference to the accompanying drawings. The present invention may, however, be embodied in different forms and should not be construed as limited to the embodiments set forth herein. Rather, these embodiments are provided so that this disclosure will be thorough and complete, and will fully convey the scope of the present invention to those skilled in the art. Throughout the disclosure, like reference numerals refer to like parts throughout the various figures and embodiments of the present invention.

Figure 3:
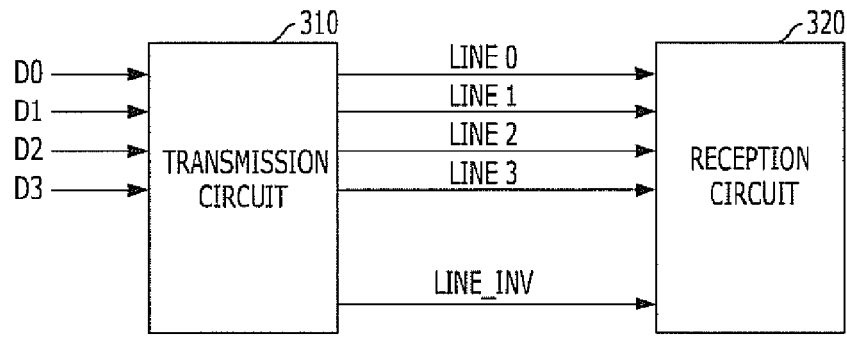
FIG. 3 is a block diagram of a data transmission/reception system in accordance with an exemplary embodiment of the present invention.

FIG. 3 is a block diagram of a data transmission/reception system in accordance with an exemplary embodiment of the present invention.

Referring to FIG. 3, the data transmission/reception system includes a transmission circuit 310 and a reception circuit 320.

The transmission circuit 310 is configured to transmit data D0 to D3 to transmission lines LINE0 to LINE3, respectively. When it is likely that the data D0 to D3 to be loaded on the transmission lines LINE0 to LINE3 exhibit a two-aggressors and one-victim pattern, the transmission circuit 310 inverts some of the data D0 to D3 before transmitting the data D0 to D3 to the transmission lines LINED to LINE3. The transmission circuit 310 transmits an inversion signal INV through an inversion line LINE_INV to indicate whether or not some of the data are inverted.

When it is likely that the data D0 to D3 to be loaded on the transmission lines LINE0 to LINE3 exhibit a two-aggressors and one-victim pattern, the transmission circuit 310 does not transmit the data D0 to D3 to the transmission lines LINE0 to LINE3 as they are, but inverts some data. Therefore, the two-aggressors and one-victim pattern does not occur on the transmission lines LINE0 to LINE3.

The reception circuit 320 is configured to receive the data transmitted through the transmission lines LINE0 to LINE3 and the inversion signal INV transmitted through the inversion line LINE_INV. The reception circuit 320 inverts the data, which has been inverted by the transmission circuit 310, in response to the inversion signal INV. As a result, the reception circuit 320 returns the data D0 to D3 to the values they had when they were inputted to the transmission circuit 310.

Figure 4:
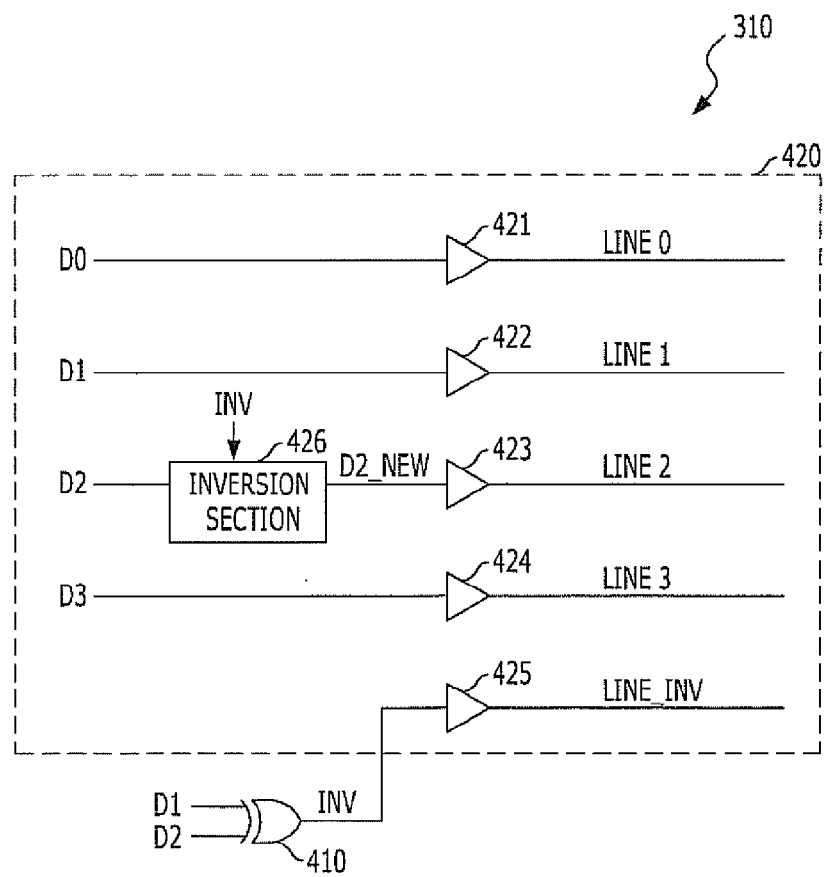
FIG. 4 is a block diagram of a transmission circuit of FIG. 3.

FIG. 4 is a block diagram of the transmission circuit 310 of FIG. 3.

Referring to FIG. 4, the transmission circuit 310 includes a pattern detection unit 410 and a transmission unit 420. The pattern detection unit 410 is configured to detect patterns of data to be loaded on the inner lines LINE1 and LINE2 among the plurality of transmission lines LINE0 to LINE3, and generate an inversion signal INV. The transmission unit 420 is configured to transmit the data D0 to D3 to the plurality of transmission lines LINE0 to LINE3 and the inversion signal INV to the inversion line LINE_INV, and invert some of the data of the inner transmission lines LINE1 and LINE2 in response to the inversion signal INV.

The pattern detection unit 410 includes an XOR gate configured to receive the data D1 and D2, perform an XOR operation on the data D1 and D2, and output the inversion signal INV. Therefore, when the data D1 and D2 have the same logic value, the inversion signal INV is in an inactive state (i.e., the inversion signal INV has a logic low level). Alternatively, when the data D1 and D2 have different logic values, the inversion signal INV is in an active state (i.e., the inversion signal INV has a logic high level). Referring to FIG. 1, it can be seen that the two-aggressors and one-victim pattern occurs only when the data D1 and D2 of the inner lines LINE1 and LINE2 are different from each other. Therefore, the pattern detection unit 410 detects whether the data D1 and D2 to be loaded on the inner lines LINE1 and LINE2 are identical to or different from each other, and generates the inversion signal INV.

The transmission unit 420 includes a plurality of drivers 421 to 425 and an inversion section 426. The drivers 421, 422, and 424 are configured to drive the data D0, D1, and D3 to the transmission lines LINE0, LINE1, and LINE3, respectively. The inversion section 426 is configured to invert the data D2 and output new data D2_NEW when the inversion signal INV is in the active state, and output the data D2 as it is when the inversion signal INV is in the inactive state. The driver 423 is configured to drive the new data D2_NEW of the inversion section 426 to the transmission line LINE2. The driver 425 is configured to drive the inversion signal INV to the inversion line LINE_INV.

FIG. 4 illustrates an example in which when the inversion signal INV is in the active state, the data D2 is inverted to obtain the new data D2_NEW and the new data D2_NEW is loaded on the transmission line LINE2. However, in another example (not shown), instead of inverting data D2, the data D1 may be inverted to obtain new data D1_NEW and the new data D1_NEW may be loaded on the transmission line LINE1 when the inversion signal INV is in the active state. In other words, by inverting just one of the data D1 and D2 on the inner lines LINE1 and LINE2, it is possible to substantially prevent data having a two-aggressors and one-victim pattern from being loaded on the data transmission lines LINE0 to LINE3.

Figure 5:
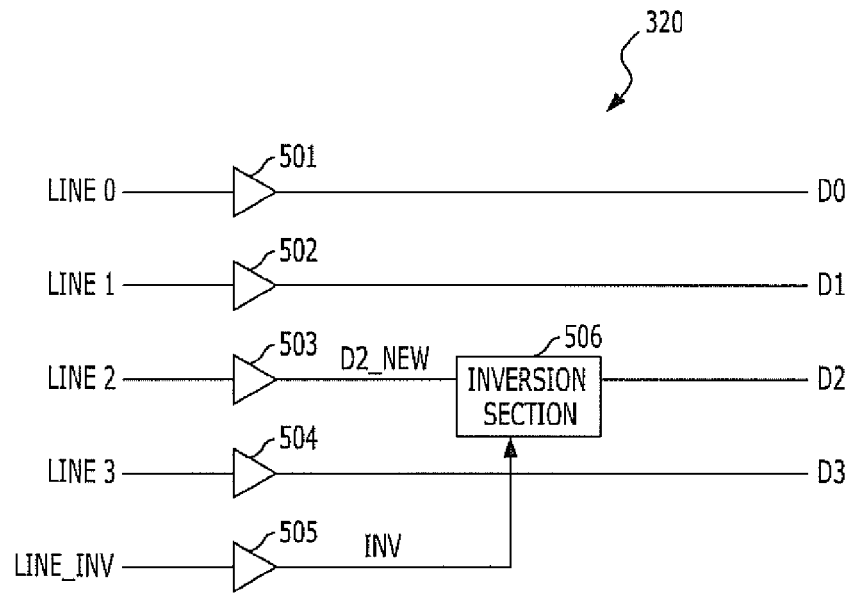
FIG. 5 is a block diagram of a reception circuit of FIG. 3.

FIG. 5 is a block diagram of the reception circuit 320 of FIG. 3.

Referring to FIG. 5, the reception circuit 320 includes a plurality of buffers 501 to 505 and an inversion section 506.

The buffers 501, 502, and 504 are configured to receive the data D0, D1, and D3 transmitted through the transmission lines LINE0, LINE1, and LINE3, respectively. The buffer 503 is configured to receive the data D2_NEW transmitted through the transmission line LINE2, and the buffer 505 is configured to receive the inversion signal INV transmitted through the inversion line LINE_INV.

The inversion section 506 is configured to invert the new data D2_NEW and output the data D2, when the inversion signal INV is in the active state. The inversion section 506 is also configured to output the new data D2_NEW as it is, when the inversion signal INV is in the inactive state. Therefore, the data D2 outputted from the inversion section 506 becomes the same data as the data D2 inputted to the transmission circuit 310.

Figure 6:
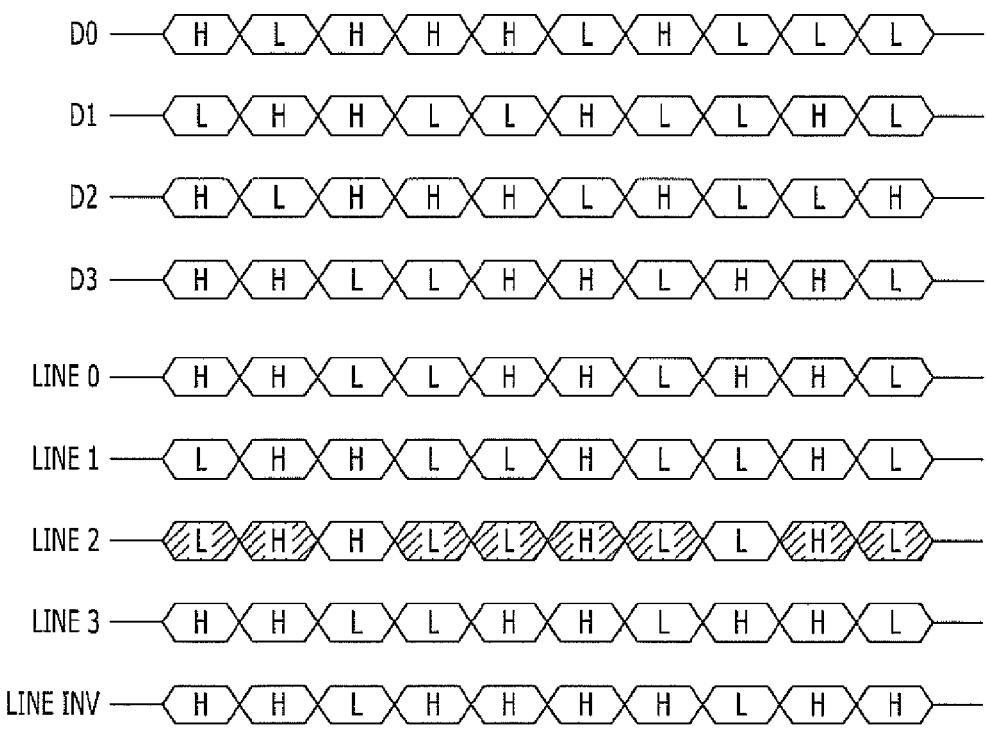
FIG. 6 is a diagram illustrating data inputted to the transmission circuit and data on transmission lines of FIG. 3.

FIG. 6 is a diagram illustrating exemplary values of the data D0 to D3 inputted to the transmission circuit 310 and the data on the transmission lines LINE1 to LINE3.

Referring to FIG. 6, when the data D1 and D2 have the same logic value, the inversion signal INV is in an active state (i.e., the inversion signal has a logic high level), the data D2 is inverted to obtain the new data D2_NEW, and the new data D2_NEW is loaded on the transmission line LINE2. As a result, it can be seen that two-aggressors and one-victim data patterns are prevented from occurring on the transmission lines LINE0 to LINE3.

For reference, the hatched data on the transmission line LINE2 of FIG. 6 indicate inverted data.

Figure 7:
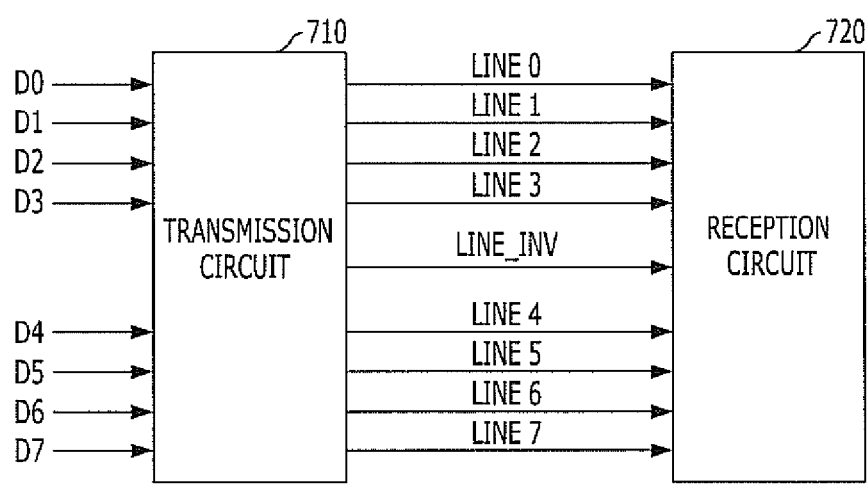
FIG. 7 is a block diagram of a data transmission/reception system in accordance with another exemplary embodiment of the present invention.

FIG. 7 is a configuration diagram of a data transmission/reception system in accordance with another exemplary embodiment of the present invention.

Referring to FIG. 7, the data transmission/reception system in accordance with this exemplary embodiment of the present invention includes a transmission circuit 710 and a reception circuit 720.

The transmission circuit 710 is configured to transmit data D0 to D7 to first transmission lines LINE0 to LINE3 and second transmission lines LINE4 to LINE7. When it is likely that the data D0 to D7 to be loaded on the first transmission lines LINE0 to LINE3 and the second transmission lines LINE4 to LINE7 exhibit a two-aggressors and one-victim pattern, the transmission circuit 710 inverts some of the data D0 to D7 to be loaded on the first transmission lines LINE0 to LINE3 and the second transmission lines LINE4 to LINE7. Furthermore, the transmission circuit 710 transmits an inversion signal INV to an inversion line LINE_INV to indicate whether or not the transmission circuit 710 has inverted some of the data. The transmission circuit 710 is described below in more detail.

The reception circuit 720 is configured to receive the data transmitted through the first transmission lines LINE0 to LINE3 and the second transmission lines LINE4 to LINE7 and the inversion signal INV transmitted through the inversion line LINE_INV. The reception circuit 720 inverts the data, which has been inverted by the transmission circuit 710, in response to the inversion signal INV. As a result, the reception circuit 720 returns the data D0 to D7 to the values they had when they were inputted to the transmission circuit 710.

Figure 8:
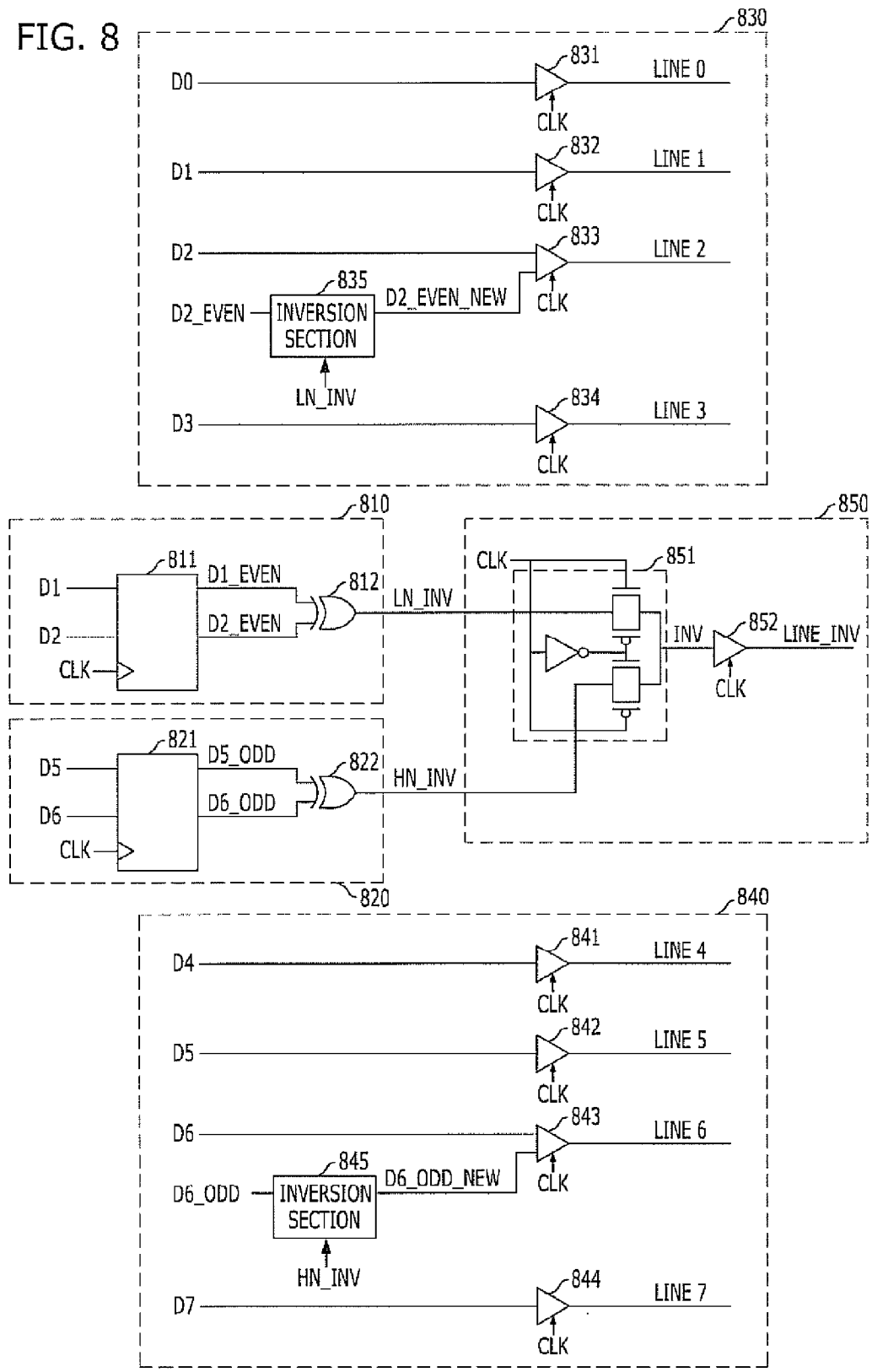
FIG. 8 is a block diagram of a transmission circuit of FIG. 7.

FIG. 8 is a block diagram of the transmission circuit 710 of FIG. 7.

Referring to FIG. 8, the transmission circuit 710 includes a first pattern detection unit 810, a second pattern detection unit 820, a first transmission unit 830, a second transmission unit 840, and an inversion transmission unit 850. The first pattern detection unit 810 is configured to detect the patterns of even data D1_EVEN and D2_EVEN to be loaded on the first inner lines LINE1 and LINE2 among the plurality of first transmission lines LINE0 to LINE3, and generate an even inversion signal LN_INV. The second pattern detection unit 820 is configured to detect the patterns of odd data D5_ODD and D6_ODD to be loaded on the second inner lines LINE5 and LINE6 among the plurality of second transmission lines LINE4 to LINE7, and generate an odd inversion signal HN_INV. The first transmission unit 830 is configured to transmit the data D0 to D3 to the plurality of first transmission lines LINE0 to LINE3, and invert some of the even data to be loaded on the first inner lines LINE1 to LINE2 among the plurality of first transmission lines LINE0 to LINE3 in response to the even inversion signal LN_INV. The second transmission unit 840 is configured to transmit the data D4 to D7 to the plurality of second transmission lines LINE4 to LINE7, and invert some of the odd data to be loaded on the second inner lines LINE5 and LINE6 among the plurality of second transmission lines LINE4 to LINE7 in response to the odd inversion signal HN_INV. The inversion transmission unit 850 is configured to alternately transmit the even inversion signal LN_INV and the odd inversion signal HN_INV to the inversion line LINE_INV.

The even data and the odd data refer to data which are alternately transmitted. For example, when the first data to be transmitted to the transmission line LINE1 is even data, the second data to be transmitted is odd data, the third data to be transmitted is even data, the fourth data to be transmitted is odd data, and so on. Hereafter, data synchronized with a logic high state of a clock signal CLK is referred to as even data, and data synchronized with a logic low state of the clock signal CLK is referred to as odd data.

The first pattern detection unit 810 includes a first input section 811 and a first XOR gate 812. The first input section 811 is configured to receive the data D1 and D2 and output even data D1_EVEN and D2_EVEN in synchronization with, for example, a logic high state of the clock signal CLK, The first XOR gate 812 is configured to receive the even data D1_EVEN and D2_EVEN and output the even inversion signal LN_INV. The first input section 811 receives the data D1 and D2 during the logic high state of the clock signal CLK. Therefore, the output of the first input section 811 becomes the even data D1_EVEN and D2_EVEN synchronized with the logic high state of the clock signal CLK. When the even data D1_EVEN and D2_EVEN have the same logic value, the even inversion signal LN_INV is in the inactive state (i.e., the even inversion signal LN_INV has a logic low level). When the even data D1_EVEN and the even data D2_EVEN have different logic values, the even inversion signal LN_INV is in an active state (i.e., the even inversion signal LN_INV has a logic high level).

The second pattern detection unit 820 includes a second input section 821 and a second XOR gate 822. The second input section 821 is configured to receive the data D5 and D6 and output odd data D5_ODD and D6_ODD in synchronization with, for example, a logic low state of the clock signal CLK. The second XOR gate 822 is configured to receive the odd data D5_ODD and D6_ODD and output an odd inversion signal HN_INV. The second input section 821 receives the data D5 and D6 during a logic low state of the clock signal CLK. Therefore, the output of the second input section 821 becomes the odd data D5_ODD and D6_ODD synchronized with the logic low state of the clock signal CLK. When the odd data D5_ODD and the odd data D6_ODD have the same logic value, the odd inversion signal HN_INV is in an inactive state (i.e., the odd inversion signal HN_INV has a logic low level). When the odd data D5_ODD and the odd data D6_ODD have different logic values, the odd inversion signal HN_INV is in an active state (i.e., the odd inversion signal HN_INV has a logic high level).

The first transmission unit 830 includes a plurality of drivers 831 to 834 and a first inversion section 835. The drivers 831, 832, and 834 are configured to drive the data D0, D1, and D3 to the first transmission line LINE0, LINE1, and LINE3, respectively. Therefore, the data D0, D1, and D3 are transmitted, without changing their values, to the transmission lines LINE0, LINE1, and LINE3 by the drivers 831, 832, and 834, respectively. The first inversion section 835 is configured to invert the even data D2_EVEN and output new even data D2_EVEN_NEW when the even inversion signal LN_INV is in an active state. The first inversion section 835 is also configured to output the even data D2_EVEN, without changing its value, as the new even data D2_EVEN_NEW, when the inversion signal LN_INV is in an inactive state. The driver 833 is configured to drive the new even data D2_EVEN_NEW to the first transmission line LINE2 during the logic high state of the clock signal CLK, and drive the data D2 to the first transmission line LINE2 during the logic low state of the clock signal CLK.

The second transmission unit 840 includes a plurality of drivers 841 to 844 and a second inversion section 845. The drivers 841, 842, and 844 are configured to drive the data D4, D5, and D7 to the second transmission lines LINE4, LINE5, and LINE7, respectively. Therefore, the data D4, D5, and D7 are transmitted, without changing their values, to the transmission lines LINE4, LINE5, and LINE7 by the drivers 841, 842, and 844, respectively. The second inversion section 845 is configured to invert the odd data D6_ODD and output new odd data D6_ODD_NEW when the odd inversion signal HN_INV is in an active state. The second inversion section 845 is also configured to output the odd data D6_ODD, without changing its value, as the new odd data D6_ODD_NEW, when the odd inversion signal HN_INV is in an inactive state. The driver 843 is configured to drive the new odd data D6_ODD_NEW to the second transmission line LINE6 during the logic low state of the clock signal CLK, and drive the data D6 to the second transmission line LINE6 during the logic high state of the clock signal CLK.

The inversion transmission unit 850 includes a selection section 851 and a driver 852. The selection section 851 is configured to select and output the even inversion signal LN_INV during the logic high state of the clock signal CLK, and select and output the odd inversion signal HN_INV during the logic low state of the clock signal CLK. As shown in FIG. 8, the selection section 851 outputs either the even inversion signal LN_INV or the odd inversion signal HN_INV as the inversion signal INV. The driver 852 is configured to drive the inversion signal INV outputted by the selection section 851 to the inversion line LINE_INV.

In FIG. 8, although the driver 833 of the first transmission unit 830 and the driver 843 of the second transmission unit 840 are represented by one circuit symbol, each of the drivers 833 and 843 may be configured in the same manner as the inversion transmission unit 850.

Figure 9:
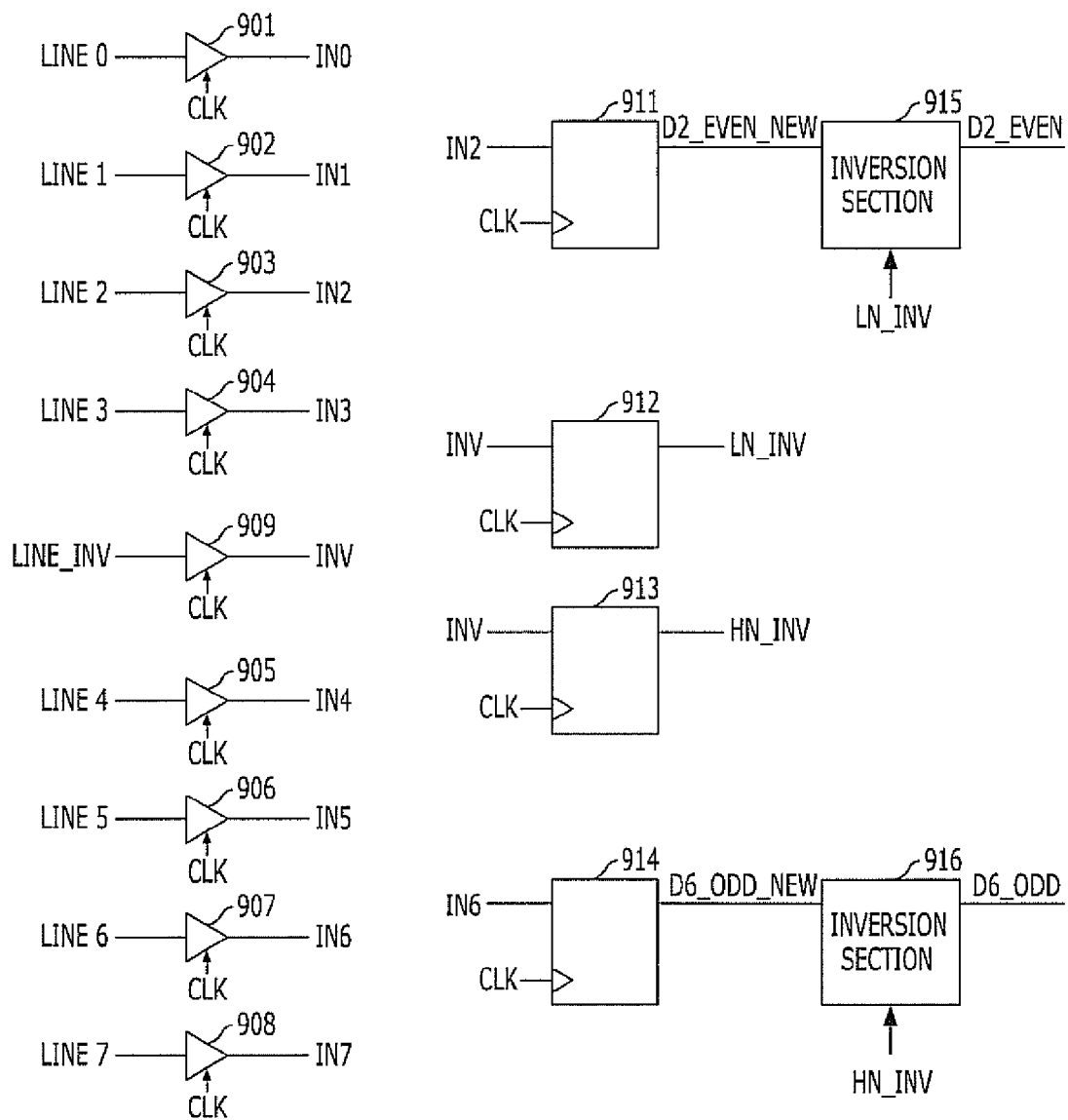
FIG. 9 is a block diagram of a reception circuit of FIG. 7.

FIG. 9 is a block diagram of the reception circuit 720 of FIG. 7.

Referring to FIG. 9, the reception circuit 720 includes buffers 901 to 909, input sections 911 to 914, and inversion sections 915 and 916. The buffers 901 to 909 are configured to receive the data from the transmission lines LINE0 to LINE7 and the inversion line LINE_INV.

The input section 912 is configured to receive an output signal INV of the buffer 909 during the logic high state of the clock signal CLK. Therefore, the output signal of the input section 912 becomes the even inversion signal LN_INV. Furthermore, the input section 913 is configured to receive the output signal INV of the buffer 909 during the logic low state of the clock signal CLK. Therefore, the output signal of the input section 913 becomes the odd inversion signal HN_INV.

The input section 911 is configured to receive an output signal IN2 of the buffer 903 during the logic high state of the clock signal CLK, and output the new even data D2_EVEN_NEW. Furthermore, the inversion section 915 is configured to invert and output the new even data D2_EVEN_NEW received from the input section 911, when the even inversion signal LN_INV is in an active state. The inversion section 915 is also configured to output the new even data D2_EVEN_NEW received from the input section 911 as it is, when the even inversion LN_INV is in an inactive state. Therefore, the output signal of the inversion section 915 becomes the even data D2_EVEN.

The input section 914 is configured to receive an output signal IN6 of the buffer 907 during the logic low state of the clock signal CLK, and output the new odd data D6_ODD_NEW. Furthermore, the inversion section 916 is configured to invert and output the new odd data D6_ODD_NEW received from the input section 914, when the odd inversion signal HN_INV is in an active state. The inversion section 916 is also configured to output the new odd data D6_ODD_NEW received from the input section 914 as it is, when the odd inversion signal HN_INV is in an inactive state. Therefore, the output signal of the inversion section 916 becomes the odd data D6_ODD.

Figure 10:
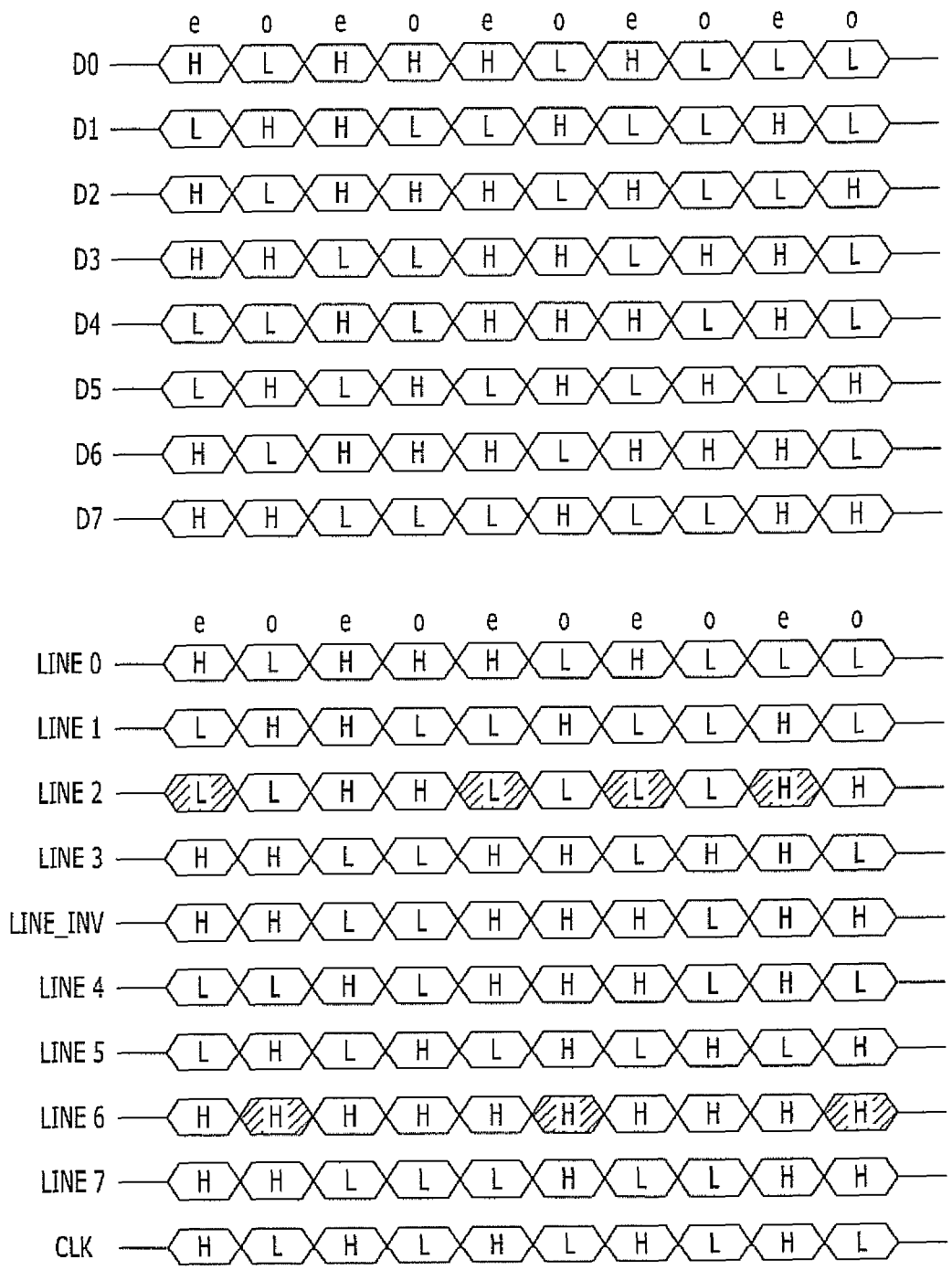
FIG. 10 is a diagram illustrating data inputted to a transmission circuit and data on transmission lines of FIG. 7.

FIG. 10 is a diagram illustrating exemplary values of the data D0 to D7 inputted to the transmission circuit 710 and the data on the transmission lines LINE0 to LINE7.

Referring to FIG. 10, it can be seen that a two-aggressors and one-victim data pattern does not occur on the first transmission lines LINE0 to LINE3 and the second transmission lines LINE4 to LINE7.

For reference, the hatched data on the first transmission line LINE2 and the second transmission line LINE6 of FIG. 10 indicate inverted data.

In accordance with the exemplary embodiments of the present invention, data having a pattern in which cross talk frequently occurs may not be loaded on the transmission lines through which the data are transmitted. Therefore, jitter effects caused by the cross talk occurring in the transmission lines are reduced. As a result, it is possible to stably transmit the data at a high speed.

While the present invention has been described with respect to the specific embodiments, it will be apparent to those skilled in the art that various changes and modifications may be made without departing from the spirit and scope of the invention as defined in the following claims. For example, it should be understood that other embodiments in which inverted data are transmitted on different inner lines than those in the exemplary embodiments discussed above (e.g., inverted data may be transmitted on transmission line LINE1 instead of LINE2 in the exemplary embodiment of FIGS. 3-6) are within the spirit and scope of the invention. Also, for example, it should be understood that other embodiments using a different number of transmission lines than those in the exemplary embodiments discussed above (i.e., a number of transmission lines other than 4 or 8) are within the spirit and scope of the invention. In such additional embodiments, pattern detection units would be modified to detect patterns of data to be loaded on one or more inner lines, where the inner lines are those lines which have adjacent lines on opposite sides.

What is claimed is:

1. A data transmission circuit comprising:
   a first pattern detection unit configured to detect a pattern of even data to be loaded on first inner lines among a plurality of first transmission lines and generate an even inversion signal;
   a second pattern detection unit configured to detect a pattern of odd data to be loaded on second inner lines among a plurality of second transmission lines and generate an odd inversion signal;
   a first transmission unit configured to transmit data to the plurality of first transmission lines and invert some of the even data to be loaded on the first inner lines in response to the even inversion signal;
   a second transmission unit configured to transmit data to the plurality of second transmission lines and invert some of the odd data to be loaded on the second inner lines in response to the odd inversion signal; and
   an inversion transmission unit configured to alternately transmit the even inversion signal and the odd inversion signal to an inversion line.

2. The data transmission circuit of claim 1, wherein the even inversion signal and the odd inversion signal are in an inactive state when the data to be loaded on the first and second inner lines, respectively, have the same logic value, and in an active state when the data to be loaded on the first and second inner lines, respectively, have different logic values.

3. The data transmission circuit of claim 2, wherein the plurality of first transmission lines comprise four lines, the plurality of second transmission lines comprises four lines, the first inner lines comprise two lines from among the plurality of first transmission lines, and the second inner lines comprise two lines from among the plurality of second transmission lines.

4. The data transmission circuit of claim 2, wherein the first transmission unit inverts even data to be loaded on one line of the first inner lines when the even inversion signal is in an active state, and
   the second transmission unit inverts odd data to be loaded on one line of the second inner lines when the odd inversion signal is in an active state.

5. The data transmission circuit of claim 1, wherein the even data is data synchronized with one logic state of a clock signal, and the odd data is data synchronized with another logic state of the clock signal.

6. A data transmission/reception system comprising a data transmission circuit and a data reception circuit,
   wherein the data transmission circuit comprises:
   a first pattern detection unit configured to detect a pattern of even data to be loaded on first inner lines among a plurality of first transmission lines and generate an even inversion signal;
   a second pattern detection unit configured to detect a pattern of odd data to be loaded on second inner lines among a plurality of second transmission lines and generate an odd inversion signal;
   a first transmission unit configured to transmit data to the plurality of first transmission lines and invert some of the even data to be loaded on the first inner lines in response to the even inversion signal;
   a second transmission unit configured to transmit data to the plurality of second transmission lines and invert some of the odd data to be loaded on the second inner lines in response to the odd inversion signal; and
   an inversion transmission unit configured to alternately transmit the even inversion signal and the odd inversion signal to an inversion line, and
   the data reception circuit comprises:
   a first reception unit configured to invert the even data inverted by the first transmission unit among the data transferred to the plurality of first transmission lines, in response to the even inversion signal; and
   a second reception unit configured to invert the odd data inverted by the second transmission unit among the data transferred to the plurality of second transmission lines, in response to the odd inversion signal.

* * * * *